US009595125B2

(12) United States Patent
Pan et al.

(10) Patent No.: US 9,595,125 B2
(45) Date of Patent: Mar. 14, 2017

(54) EXPANDING A DIGITAL REPRESENTATION OF A PHYSICAL PLANE

(71) Applicant: QUALCOMM Incorporated, San Diego, CA (US)

(72) Inventors: Qi Pan, Vienna (AT); Istvan Siklossy, Vienna (AT); Irene Reisner-Kollmann, Vienna (AT); Michael Gervautz, Vienna (AT); Per Orum Nielsen, San Diego, CA (US); Roy Lawrence Ashok Inigo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 14/472,288

(22) Filed: Aug. 28, 2014

(65) Prior Publication Data

US 2015/0062166 A1 Mar. 5, 2015

Related U.S. Application Data

(60) Provisional application No. 61/872,474, filed on Aug. 30, 2013.

(51) Int. Cl.
G09G 5/00 (2006.01)
G06T 11/60 (2006.01)
G06T 7/00 (2006.01)
G06T 19/00 (2011.01)

(52) U.S. Cl.
CPC .............. *G06T 11/60* (2013.01); *G06T 7/004* (2013.01); *G06T 7/0081* (2013.01); *G06T 19/006* (2013.01)

(58) Field of Classification Search
None
See application file for complete search history.

(56) References Cited

U.S. PATENT DOCUMENTS

| 5,644,386 A | 7/1997 | Jenkins et al. |
| 6,191,796 B1 | 2/2001 | Tarr |

(Continued)

OTHER PUBLICATIONS

Li et al., 2D-3D Fusion for Layer Decomposition of Urban Facades, 2011, IEEE International Conference on Computer Vision, pp. 882-889.*

(Continued)

*Primary Examiner* — Anh-Tuan V Nguyen
(74) *Attorney, Agent, or Firm* — Kilpatrick Townsend & Stockton LLP

(57) ABSTRACT

Techniques are presented for expanding a digital representation of a physical plane from a physical scene. In some aspects, a method may include determining an orientation and an initial portion of a physical plane in the scene, and subdividing a rectified image for the scene into a plurality of grid cells. For the grid cells, an image signature may be generated. A grid cell contiguous to the obtained initial portion of the plane is determined to include part of the plane. An iterative process may be performed for each neighboring grid cell from the grid cell contiguous to at least part of the obtained initial portion, determining whether the neighboring grid cell is to be included as part of the plane if the image signature of said neighboring grid cell is similar to the image signature of a grid cell already determined to be included as part of the plane.

26 Claims, 9 Drawing Sheets

(56) References Cited

U.S. PATENT DOCUMENTS

| | | | | |
|---|---|---|---|---|
| 6,611,622 B1* | 8/2003 | Krumm | | G06K 9/00228 |
| | | | | 382/165 |
| 7,298,869 B1* | 11/2007 | Abernathy | | G06K 9/0063 |
| | | | | 324/323 |
| 8,121,433 B2* | 2/2012 | Leprince | | G01C 11/02 |
| | | | | 342/355 |
| 8,396,293 B1 | 3/2013 | Korah et al. | | |
| 8,605,992 B2* | 12/2013 | Kohli | | G06T 5/005 |
| | | | | 345/419 |
| 8,818,076 B2* | 8/2014 | Shenkar | | G06T 17/05 |
| | | | | 345/420 |
| 2003/0038802 A1* | 2/2003 | Johnson | | G06T 17/30 |
| | | | | 345/420 |
| 2008/0273795 A1* | 11/2008 | Ofek | | G06K 9/4642 |
| | | | | 382/170 |
| 2008/0310757 A1* | 12/2008 | Wolberg | | G06K 9/00208 |
| | | | | 382/285 |
| 2010/0079456 A1* | 4/2010 | Barth | | G06T 7/0083 |
| | | | | 345/424 |
| 2010/0092038 A1* | 4/2010 | Theodore | | G06K 9/00201 |
| | | | | 382/103 |
| 2010/0201682 A1* | 8/2010 | Quan | | G06K 9/00704 |
| | | | | 345/419 |
| 2010/0214291 A1* | 8/2010 | Muller | | G06K 9/4604 |
| | | | | 345/420 |
| 2010/0289817 A1 | 11/2010 | Meier et al. | | |
| 2011/0102545 A1* | 5/2011 | Krishnaswamy | | G01C 21/12 |
| | | | | 348/46 |
| 2012/0041722 A1* | 2/2012 | Quan | | G06T 7/0071 |
| | | | | 703/1 |
| 2012/0243774 A1* | 9/2012 | Chen | | G06T 15/205 |
| | | | | 382/154 |
| 2012/0257814 A1* | 10/2012 | Kohli | | G06T 5/005 |
| | | | | 382/154 |
| 2012/0269425 A1* | 10/2012 | Marchesotti | | G06K 9/036 |
| | | | | 382/159 |
| 2013/0083999 A1* | 4/2013 | Bhardwaj | | G06Q 30/0643 |
| | | | | 382/165 |
| 2013/0094705 A1* | 4/2013 | Tyagi | | G06K 9/00369 |
| | | | | 382/103 |
| 2013/0124951 A1 | 5/2013 | Shechtman et al. | | |
| 2013/0272600 A1* | 10/2013 | Garcia Becerro | | G06T 7/0024 |
| | | | | 382/154 |
| 2013/0336581 A1* | 12/2013 | Datta | | G06K 9/00785 |
| | | | | 382/165 |
| 2014/0015924 A1* | 1/2014 | Pryor | | G06T 15/20 |
| | | | | 348/43 |
| 2014/0267397 A1* | 9/2014 | Wagner | | G06T 7/0044 |
| | | | | 345/633 |
| 2014/0314271 A1* | 10/2014 | Xu | | G06K 9/00369 |
| | | | | 382/103 |
| 2014/0334670 A1* | 11/2014 | Guigues | | G06T 7/2046 |
| | | | | 382/103 |
| 2014/0350839 A1* | 11/2014 | Pack | | G01C 21/30 |
| | | | | 701/409 |

OTHER PUBLICATIONS

International Search Report and Written Opinion—PCT/US2014/053582—ISA/EPO—Dec. 23, 2014.

Kaushik, R, et al., "Fast Planar Clustering and Polygon Extraction from Noisy Range Images Acquired in Indoor Environments", Proceedings of the 2010 IEEE International Conference on Mechantronics and Automation, Aug. 4-7, 2010, pp. 483-488.

Ruiqi, G., et al., "Support Surface Prediction in Indoor Scenes", 2013 IEEE International Conference on Computer Vision, Dec. 1, 2013, pp. 2144-2151.

Xiao, J., et al., "Fast Plane Detection for SLAM from Noisy Range Images in Both Structured and Unstructured Environments", Proceedings of the 2011 IEEE International Conference on Mechantronics and Automation, Aug. 7-10, 2011, pp. 1768-1773.

Zhan, Q., et al., "Color-Based Segmentation of Point Clouds", Laser Scanning 2009, IAPRS, vol. XXXVIII, Part 3/W8, Paris, France, Sep. 1-2, 2009, pp. 248-252.

\* cited by examiner

EXPANDING A DIGITAL REPRESENTATION OF A PHYSICAL PLANE

CROSS REFERENCE SECTION

This application is a non-provisional application and claims the benefit of priority of U.S. Provisional Application No. 61/872,474, filed on Aug. 30, 2013, titled "Expand a Plane Based on Color/Image Information on a Mobile Device," which is herein incorporated by reference in its entirety for all purposes.

TECHNICAL FIELD

The present disclosures generally relate to augmented reality environments, and more specifically, machine-based recognition of real-world surroundings.

BACKGROUND

In augmented reality (AR) environments, a user may view an integration of artificial or virtual graphics with the user's natural surroundings. In some early implementations of AR, a user may see graphics displayed arbitrarily amongst or within the user's natural surroundings via, for example, augmented reality goggles. For example, a graphic of a random butterfly may fly along the view of the AR goggles while the user continues to view his natural surroundings, regardless of whether the butterfly has any relevance to anything the user is seeing naturally. In more sophisticated implementations of AR, a user may be able to apply AR features or graphics directly to objects or structures of the user's natural surroundings. For example, the user may want to direct the graphic of the butterfly to land on a wall or a table, which requires first that the AR environment recognize where in fact the wall or table actually resides in the user's field of view.

In other cases, robots or other automated machines may apply similar concepts and techniques in the AR field when attempting to orient the robots in natural surroundings. For example, a robot may require an understanding of where are the walls and tables in the robot's natural surroundings, so that the robot does not run into the walls or tables. In other cases, the robot may interact with the natural surroundings by, for example, identifying a cup on a table and picking up the cup. Performing such a task may first require the robot to successfully identify the cup, and in some cases, the table that the cup is on. However, achieving machine-based recognition of natural surroundings in real time has proven to be a difficult problem to solve, as existing techniques may not be fast enough or energy efficient enough for real-time purposes, for example. Thus, there is a need in the art for improved methods of machine-based recognition of natural surroundings in a real-time setting.

SUMMARY

The present disclosures generally relate to augmented reality environments, and more specifically, machine-based recognition of real-world surroundings.

Systems, methods, and devices are presented for expanding a digital representation of a physical plane from a physical scene. In some aspects, a method may include determining an orientation and an initial portion of a physical plane in the scene, and subdividing a rectified image for the scene into a plurality of grid cells. For the grid cells, an image signature may be generated. A grid cell contiguous to the obtained initial portion of the plane may be determined to include part of the physical plane. An iterative process may be performed for each neighboring grid cell from the grid cell contiguous to at least part of the obtained initial portion, determining whether the neighboring grid cell is to be included as part of the plane if the image signature of said neighboring grid cell is similar to the image signature of a grid cell already determined to be included as part of the plane.

An example method for constructing a digital representation of a physical plane from a physical scene may include determining an orientation and an initial portion of a physical plane in the image of the physical scene in three dimensional space, generating a rectified image, wherein the rectified image contains a fronto-parallel view of at least part of the physical plane, subdividing the rectified image into a plurality of grid cells, for each of the plurality of grid cells, generating an image signature based on at least one image characteristic associated with said grid cell, selecting one or more initial grid cells contiguous to at least part of the obtained initial portion of the physical plane to include as part of the digital representation of the physical plane, comparing the image signature for each neighboring grid cell contiguous to the one or more initial grid cells to the image signature of one or more grid cells currently included in the digital representation of the physical plane, and adding each grid cell that meets a predetermined threshold to the digital representation of the physical plane.

Another example method for constructing a digital representation of a physical plane from a physical scene may include determining an orientation and an initial portion of a physical plane in the physical scene in three dimensional space, generating a rectified image, wherein the rectified image contains a fronto-parallel view of at least part of the physical plane, and subdividing the fronto-parallel view of the physical plane into a plurality of grid cells.

For each of the plurality of grid cells, the method may further include generating an image signature based on at least one image characteristic associated with the said grid cells, determining a grid cell contiguous to at least part of the obtained initial portion of the physical plane to include as part of the digital representation of the physical plane, and for each neighboring grid cell from the grid cells contiguous to at least part of the obtained initial portion: (a) determining whether the neighboring grid cell is to be additionally included as part of the digital representation of the physical plane if the image signature of said neighboring grid cell is similar to the image signature of a grid cell already determined to be included as part of the digital representation of the physical plane, wherein the similarity is based on at least one predetermined threshold criterion, and continuing the process in (a) for each neighboring grid cell contiguous to a grid cell already included as part of the digital representation of the physical plane, until there remain no neighboring grid cells that are determined, based on the process in (a), to be additionally included as part of the plane.

In one aspect, the initial portion of the physical plane is based on a known object positioned on the physical plane. In another aspect, the initial portion of the physical plane is based on fitting the physical plane to a point cloud model.

In certain aspects, the image signature comprises at least one histogram indicative of image information associated with the grid cell. In some implementations, he at least one histogram may include a statistical representation of an amount and type of colors present in the grid cell, a gradient orientation of the grid cell and amount and type of gray scale shades representative of colors present in the grid cell.

In some implementations, the at least one image characteristic associated with the said grid cell comprises three dimensional information. In one aspect, for each neighboring grid cell determined to not be included as part of the digital representation of the physical plane, the method may further include generating a plurality of secondary grid cells, wherein a position of each of the plurality of secondary grid cells is based on an offset from a position of said neighboring grid cell, wherein the offset is within a width and a length of said neighboring grid cell, and for each of the plurality of secondary grid cells, generating an image signature based on at least one image characteristic associated with the secondary grid cell, and determining whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

An apparatus for constructing a digital representation of a physical plane from a physical scene may include memory and one or more processors. The one or more processors may be configured to determine an orientation and an initial portion of a physical plane in the physical scene in three dimensional space, receive on or more images of the physical scene, generate a rectified image, wherein the rectified image contains a fronto-parallel view of at least part of the physical plane, subdivide the rectified image into a plurality of grid cells, for each of the plurality of grid cells, generate an image signature based on at least one image characteristic associated with said grid cell, select one or more initial grid cells contiguous to at least part of the obtained initial portion of the physical plane to include as part of the digital representation of the physical plane, compare the image signature for each neighboring grid cell contiguous to the one or more initial grid cells to the image signature of one or more grid cells currently included in the digital representation of the physical plane, and add each grid cell that meets a predetermined threshold to the digital representation of the physical plane.

An example apparatus for constructing a digital representation of a physical plane from a physical scene, may include memory, a camera for receiving image data, one or more processors. The processors may be configured for determining an orientation and an initial portion of a physical plane in the physical scene in three dimensional space, generating a rectified image, wherein the rectified image contains a fronto-parallel view of at least part of the physical plane, and subdividing the fronto-parallel view of the physical plane into a plurality of grid cells.

For each of the plurality of grid cells, the one or more processors may be further configured for generating an image signature based on at least one image characteristic associated with the said grid cells, determining a grid cell contiguous to at least part of the obtained initial portion of the physical plane to include as part of the digital representation of the physical plane, and for each neighboring grid cell from the grid cells contiguous to at least part of the obtained initial portion: (a) determining whether the neighboring grid cell is to be additionally included as part of the digital representation of the physical plane if the image signature of said neighboring grid cell is similar to the image signature of a grid cell already determined to be included as part of the digital representation of the physical plane, wherein the similarity is based on at least one predetermined threshold criterion, and continuing the process in (a) for each neighboring grid cell contiguous to a grid cell already included as part of the digital representation of the physical plane, until there remain no neighboring grid cells that are determined, based on the process in (a), to be additionally included as part of the plane.

In one aspect, the initial portion of the physical plane is based on a known object positioned on the physical plane. In another aspect, the initial portion of the physical plane is based on fitting the physical plane to a point cloud model.

In certain aspects, the image signature comprises at least one histogram indicative of image information associated with the grid cell. In some implementations, he at least one histogram may include a statistical representation of an amount and type of colors present in the grid cell, a gradient orientation of the grid cell and amount and type of gray scale shades representative of colors present in the grid cell.

In some implementations, the at least one image characteristic associated with the said grid cell comprises three-dimensional information. In one aspect, the at least one predetermined threshold criterion is based on comparing the at least one histogram of the grid cell already included as part of the plane to the histogram of neighboring grid cell.

In one aspect, for each neighboring grid cell determined to not be included as part of the digital representation of the physical plane by the one or more processors, the apparatus may be further configured for generating a plurality of secondary grid cells, wherein a position of each of the plurality of secondary grid cells is based on an offset from a position of said neighboring grid cell, wherein the offset is within a width and a length of said neighboring grid cell, and for each of the plurality of secondary grid cells, generating an image signature based on at least one image characteristic associated with the secondary grid cell, and determining whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

An example non-transitory computer-readable storage medium, wherein the non-transitory computer-readable storage medium comprises instructions executable by a processor, the instructions comprising instructions to determine an orientation and an initial portion of a physical plane in the physical scene in three dimensional space, receive on or more images of the physical scene, generate a rectified image, wherein the rectified image contains a fronto-parallel view of at least part of the physical plane, subdivide the rectified image into a plurality of grid cells, for each of the plurality of grid cells, generate an image signature based on at least one image characteristic associated with said grid cell, select one or more initial grid cells contiguous to at least part of the obtained initial portion of the physical plane to include as part of the digital representation of the physical plane, compare the image signature for each neighboring grid cell contiguous to the one or more initial grid cells to the image signature of one or more grid cells currently included in the digital representation of the physical plane, and add each grid cell that meets a predetermined threshold to the digital representation of the physical plane.

Another example non-transitory computer-readable storage medium, wherein the non-transitory computer-readable storage medium may include instructions executable by a processor for determining an orientation and an initial portion of a physical plane in the physical scene in three dimensional space, generating a rectified image, wherein the rectified image contains a fronto-parallel view of at least part of the physical plane, and subdividing the fronto-parallel view of the physical plane into a plurality of grid cells.

For each of the plurality of grid cells, the instructions may be configured for generating an image signature based on at least one image characteristic associated with the said grid cells, determining a grid cell contiguous to at least part of the obtained initial portion of the physical plane to include as part of the digital representation of the physical plane, and for each neighboring grid cell from the grid cells contiguous to at least part of the obtained initial portion: (a) determining whether the neighboring grid cell is to be additionally included as part of the digital representation of the physical plane if the image signature of said neighboring grid cell is similar to the image signature of a grid cell already determined to be included as part of the digital representation of the physical plane, wherein the similarity is based on at least one predetermined threshold criterion, and continuing the process in (a) for each neighboring grid cell contiguous to a grid cell already included as part of the digital representation of the physical plane, until there remain no neighboring grid cells that are determined, based on the process in (a), to be additionally included as part of the plane.

In one aspect, the initial portion of the physical plane is based on a known object positioned on the physical plane. In another aspect, the initial portion of the physical plane is based on fitting the physical plane to a point cloud model.

In certain aspects, the image signature comprises at least one histogram indicative of image information associated with the grid cell. In some implementations, he at least one histogram may include a statistical representation of an amount and type of colors present in the grid cell, a gradient orientation of the grid cell and amount and type of gray scale shades representative of colors present in the grid cell.

In some implementations, the at least one image characteristic associated with the said grid cell comprises three dimensional information. In one aspect, for each neighboring grid cell determined to not be included as part of the digital representation of the physical plane by the one or more processors, the instructions may be further configured for generating a plurality of secondary grid cells, wherein a position of each of the plurality of secondary grid cells is based on an offset from a position of said neighboring grid cell, wherein the offset is within a width and a length of said neighboring grid cell, and for each of the plurality of secondary grid cells, generating an image signature based on at least one image characteristic associated with the secondary grid cell, and determining whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

An example apparatus for constructing a digital representation of a physical plane from a physical scene may include means for determining an orientation and an initial portion of a physical plane in the image of the physical scene in three dimensional space, means for generating a rectified image, wherein the rectified image contains a fronto-parallel view of at least part of the physical plane, means for subdividing the rectified image into a plurality of grid cells, for each of the plurality of grid cells, means for generating an image signature based on at least one image characteristic associated with said grid cell, means for selecting one or more initial grid cells contiguous to at least part of the obtained initial portion of the physical plane to include as part of the digital representation of the physical plane, means for comparing the image signature for each neighboring grid cell contiguous to the one or more initial grid cells to the image signature of one or more grid cells currently included in the digital representation of the physical plane, and means for adding each grid cell that meets a predetermined threshold to the digital representation of the physical plane.

Another example apparatus for constructing a digital representation of a physical plane from a physical scene may include means for determining an orientation and an initial portion of a physical plane in the physical scene in three dimensional space, means for generating a rectified image, wherein the rectified image contains a fronto-parallel view of at least part of the physical plane, and means for subdividing the fronto-parallel view of the physical plane into a plurality of grid cells.

For each of the plurality of grid cells, the apparatus may further include means for generating an image signature based on at least one image characteristic associated with the said grid cells, means for determining a grid cell contiguous to at least part of the obtained initial portion of the physical plane to include as part of the digital representation of the physical plane, and for each neighboring grid cell from the grid cells contiguous to at least part of the obtained initial portion: (a) means for determining whether the neighboring grid cell is to be additionally included as part of the digital representation of the physical plane if the image signature of said neighboring grid cell is similar to the image signature of a grid cell already determined to be included as part of the digital representation of the physical plane, wherein the similarity is based on at least one predetermined threshold criterion, and means for continuing the process in (a) for each neighboring grid cell contiguous to a grid cell already included as part of the digital representation of the physical plane, until there remain no neighboring grid cells that are determined, based on the process in (a), to be additionally included as part of the plane.

In one aspect, the initial portion of the physical plane is based on a known object positioned on the physical plane. In another aspect, the initial portion of the physical plane is based on fitting the physical plane to a point cloud model.

In certain aspects, the image signature comprises at least one histogram indicative of image information associated with the grid cell. In some implementations, he at least one histogram may include a statistical representation of an amount and type of colors present in the grid cell, a gradient orientation of the grid cell and amount and type of gray scale shades representative of colors present in the grid cell.

In some implementations, the at least one image characteristic associated with the said grid cell comprises three dimensional information. In one aspect, the at least one predetermined threshold criterion is based on comparing the at least one histogram of the grid cell already included as part of the plane to the histogram of neighboring grid cell.

In one aspect, for each neighboring grid cell determined to not be included as part of the digital representation of the physical plane, the apparatus may further include means for generating a plurality of secondary grid cells, wherein a position of each of the plurality of secondary grid cells is based on an offset from a position of said neighboring grid cell, wherein the offset is within a width and a length of said neighboring grid cell, and for each of the plurality of secondary grid cells, means for generating an image signature based on at least one image characteristic associated with the secondary grid cell, and means for determining whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

The foregoing has outlined rather broadly features and technical advantages of examples in order that the detailed description that follows can be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
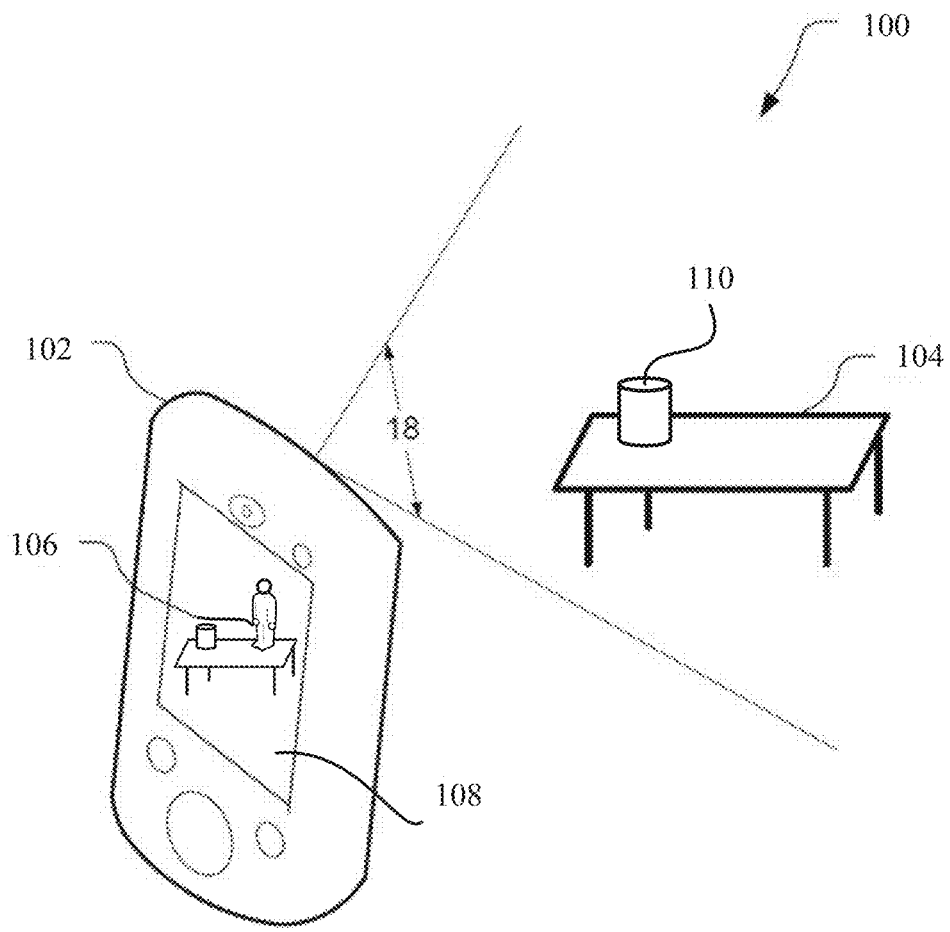
FIG. 1 illustrates an example device and scenario for using various aspects of the present disclosures.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The word "exemplary" is used herein to mean "serving as an example, instance, or illustration." Any embodiment or design described herein as "exemplary" is not necessarily to be construed as preferred or advantageous over other embodiments or designs.

Methods and apparatuses are presented for identifying and determining a dense digital representation of flat surfaces, in an augmented reality (AR) environment, based on a user's natural surroundings. Example of a flat surface may be a tabletop, floor or counter space in the kitchen. As mentioned hereinafter, a flat surface may be interchangeably referred to as a plane or a physical plane.

Building an AR application based on an unknown real-world scene may be challenging because it is not known in advance, which scene and which type of objects will be reconstructed at runtime. For example, it is not known in advance if the user is entering a room or going outside in a natural environment. Therefore, it may be very difficult to create a sophisticated augmented reality application based on any type of scene.

Generally, it may be possible to use a generic representation of a scene, such as one large triangle mesh for the whole scene. In some instances, this may be reasonable if someone wants to render the reconstructed scene. However, it may be desirable to not only render the reconstructed scene but also interact with the rendered scene with various real and virtual objects. More complicated use cases such as growing a virtual plant around a real-world object may be achievable by segmenting the reconstructed scene into parts. Embodiments described herein enable reconstructing generic scenes into meaningful reconstructed components that correlate to individual surfaces and objects with varying properties.

Certain embodiments of the present disclosure may represent an unknown real-world scene as a digital representation of a physical plane (also referred to as an augmented reality (AR) plane) with multiple objects on top of it. The proposed representation may be used for most of the typical scenarios for indoor AR applications such as a tabletop or a floor. The proposed representation may also be used for outdoor AR applications.

By representing and reconstructing scenes, according to embodiments described, a meaningful segmentation may be performed for a digital representation of a physical plane representing a ground plane (e.g., table/floor) and individual objects may be represented on top the digital representation of the physical plane. For certain embodiments, the represented objects may be used for individual augmentations and replacement of real-world objects form the physical scene in the AR environment. For example, the color of the real-world object may be augmented with a different color or the real-word object may be completely replaced with a virtual object. In addition, a sophisticated game play may be generated based on multiple objects.

The digital representation of the physical plane, i.e. AR plane, as proposed herein may have boundaries that correspond to the real edges of the surface (e.g., edges of a table). Using the proposed representation, a developer may render the digital representation of the physical plane with a specific appearance (e.g., let grass grow on the ground plane).

A digital representation of a physical plane may be derived using information from a rectified image. In some implementations, the rectified image may include a two dimensional image with three dimensional information, wherein the three dimensional information is associated with certain features of the two dimensional image. In other implementations, the rectified image may be a three dimensional image.

As described in further detail below, a rectified image scene may be generated by analyzing a plurality of two-dimensional images for a physical scene. For example, in certain embodiments, to analyze a physical environment, a simultaneous localization and mapping (SLAM) process may be used for creating a rectified image. A SLAM process may include a first two-dimensional image of a physical environment being captured using a camera. The two-dimensional image may lack depth information. The camera may then be moved a distance. This distance (and direction) may be measured. A second image may be captured of the physical environment. By using the travelled distance and direction, the depth of multiple identified reference points in the two images that are determined to match may be calculated. Implementations of a SLAM process may use many more images to refine the determined locations of corresponding reference points and to identify additional reference points in the physical environment to create the rectified image. In addition to the use of SLAM, some other form of three-dimensional mapping process may be used, such as by capturing images that include depth information, for example using time-of-flight analysis or a stereoscopic camera system. As described herein, although the SLAM process may be used for illustration purposes, other techniques may be used instead of SLAM without deviating from the scope of the invention.

In some embodiments, a point cloud can be created that includes multiple reference points, with each reference point having a depth value. As detailed herein, the point cloud obtained using a SLAM process may be used to create the rectified image.

The digital representation of the physical plane may represent a planar region in which no physical objects are present and on which virtual objects can be positioned and moved in an AR environment without regard to possible collision with a physical object.

A digital representation of the physical plane may define a plane that is composed of multiple grid cells, such as polygonal cells. Each grid cell may represent a convex planar region where a virtual object can be positioned without colliding with another object (such as the user's view of a physical object).

Referring to FIG. 1, an example AR system is illustrated. In certain embodiments, the AR system 100 may be configured to perform a SLAM process. System 100 includes a computing device 102, such as a mobile device. The mobile device may be any portable computing device with an input sensory unit, such as a camera, and a display 108. Here, the computing device 102 may be a mobile device, such as a smart phone, although the functionality described herein is not limited to smart phones. For example, the computing device 102 may be any portable or mobile device such as a digital camera, a camcorder, a tablet computer, a personal digital assistant, a video game console, a head-mounted display (HMD) or other wearable display, a projector device, or other device. Further, instead of the mobile device, a computing device 102 such as a personal computer (e.g., desktop computer), or other non-hand-held device or device not typically labeled a mobile device, could be used. The computing device may include a camera for capturing images of physical objects in the real-world physical environment. In the illustrated embodiment, a cylinder 110 (e.g., can of soup) is present on a table 104.

The computing device 102 may be configured to augment reality by capturing images of the physical environment, here capturing images of the table 104 on which the can of soup is situated, and displaying the additional imagery on a transparent or semi-transparent display supplemented with one or more virtual objects. In FIG. 1, a three-dimensional character 106 is superimposed on the view of the physical environment, including table 104. Three-dimensional character 106 may be any form of virtual object and is not restricted to a humanoid character. Three-dimensional character 106 may be permitted to move to various locations on an digital representation of the physical plane that has been generated to correspond to portions of the surface of table 104 as detailed herein. In certain embodiments, the AR plane may be constructed such that the can of soup is excluded from the AR plane, thus precluding three-dimensional character 106 from appearing to collide with the can of soup in the AR environment presented on the display of computing device 102.

In one or more arrangements, computing device 100 may use any and/or all of the sensors alone or in combination to obtain data about the natural surroundings of computing device 100, either based on one or more images or other means for defining physical boundaries. For example, computing device 100 may use one or more cameras to obtain one or more graphical views of the natural surroundings of computing device 100. As a more complex example, one or more processors in combination with one or more cameras in computing device 100 may be used to view the natural surroundings through multiple images recorded and/or received over time. In a specific example, the natural surroundings may include a table or other flat surface, and multiple objects laying on top of the table. Computing device 100 may utilize one or more cameras to view the table from multiple angles or perspectives, providing multiple frames of image data about the table and the objects on it. While these image data are described here as examples, any other sort of data obtained by a computing device 100, whether through one or more sensors in computing device 100, or through wireless means or wired means, may be considered as part of implementing one or more aspects of the disclosure.

Figure 2:
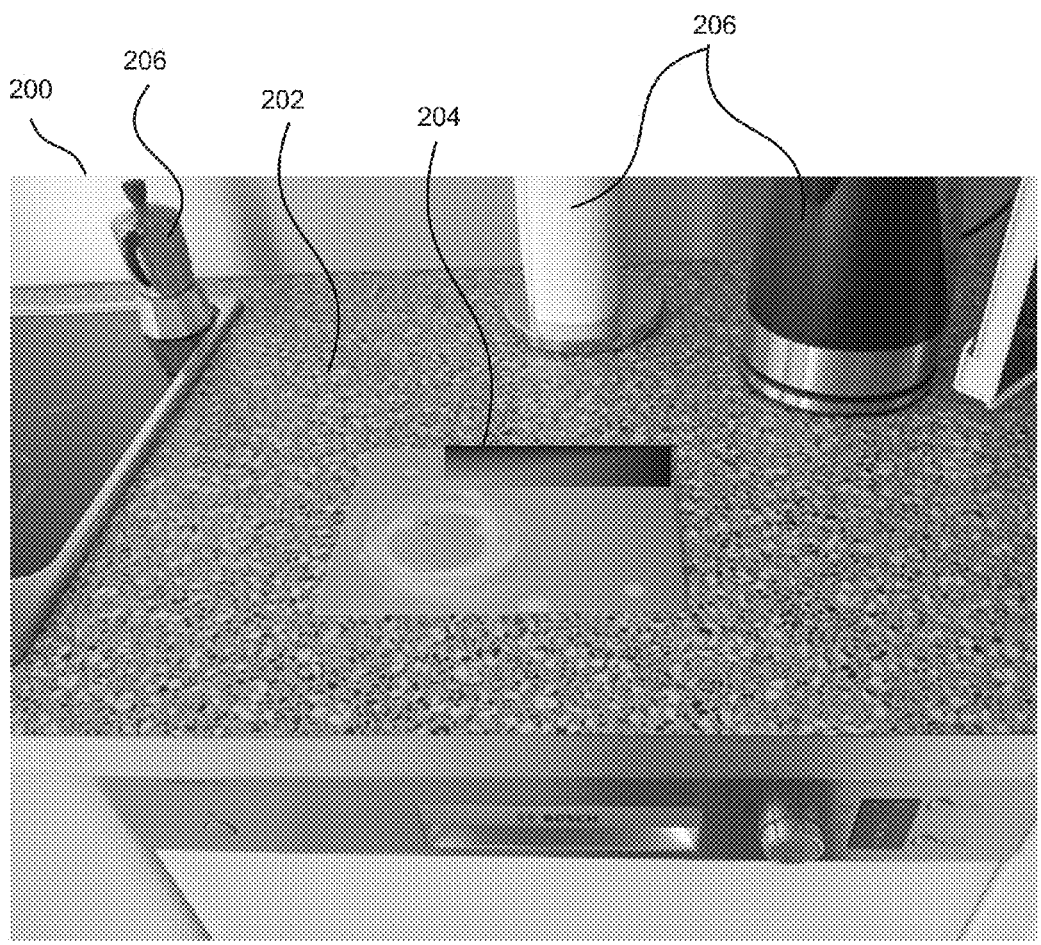
FIG. 2 shows an example image used to identify a physical plane in the natural environment, according to some aspects of the disclosure.

Referring to FIG. 2, illustration 200 presents an example physical scene for determining the physical plane and identifying the boundaries, according to some embodiments. Here, surface 202 is to be identified as the physical plane in the environment of image 200. Surface 202 appears to be a countertop with a speckled design of multi-colored rocks or pebbles. An example target object 204 resides on top of surface 202, which is visually distinct from the design in surface 202. In some embodiments, methods for identifying the surface and the boundaries of the surface include using a known object, such as a target object as an initial starting point for surface determination algorithms. In other cases, an initial determination of an orientation and position of the surface 202 may be determined using data obtained from a point cloud, e.g. methods based on simultaneous and localization and mapping (SLAM) or through methods based on a depth sensor for example. That is, given a sparse or dense set of points representing the environment through methods such as in SLAM, the orientation and position of the physical plane can be hypothesized. Other techniques for determining the orientation and position of the physical plane may be used without deviating from the scope of the invention. For example, the detecting multiple coplanar features, or cells with similar color may indicate the initial orientation and position of the physical plane in some instances. As shown, surface 202 also includes a number of objects residing on top, such as objects 206. It is desirable to exclude these objects from the determination of the surface.

Given an estimate of the orientation and position of the plane, algorithms according to some embodiments can be used to extend the boundaries of the digital representation of the physical plane by looking at various image characteristics or signatures about the physical plane, such as color and intensity statistics in camera images. In one implementation, the boundaries of a plane may be determined by using a flood-filling algorithm based on the color or intensity of pixels in the camera image. However, this may not work as well on a surface that is not of one consistent color (e.g. kitchen granite worktop 200 in FIG. 2), or there are effects such as reflections on the surface (e.g. glass).

Figure 3:
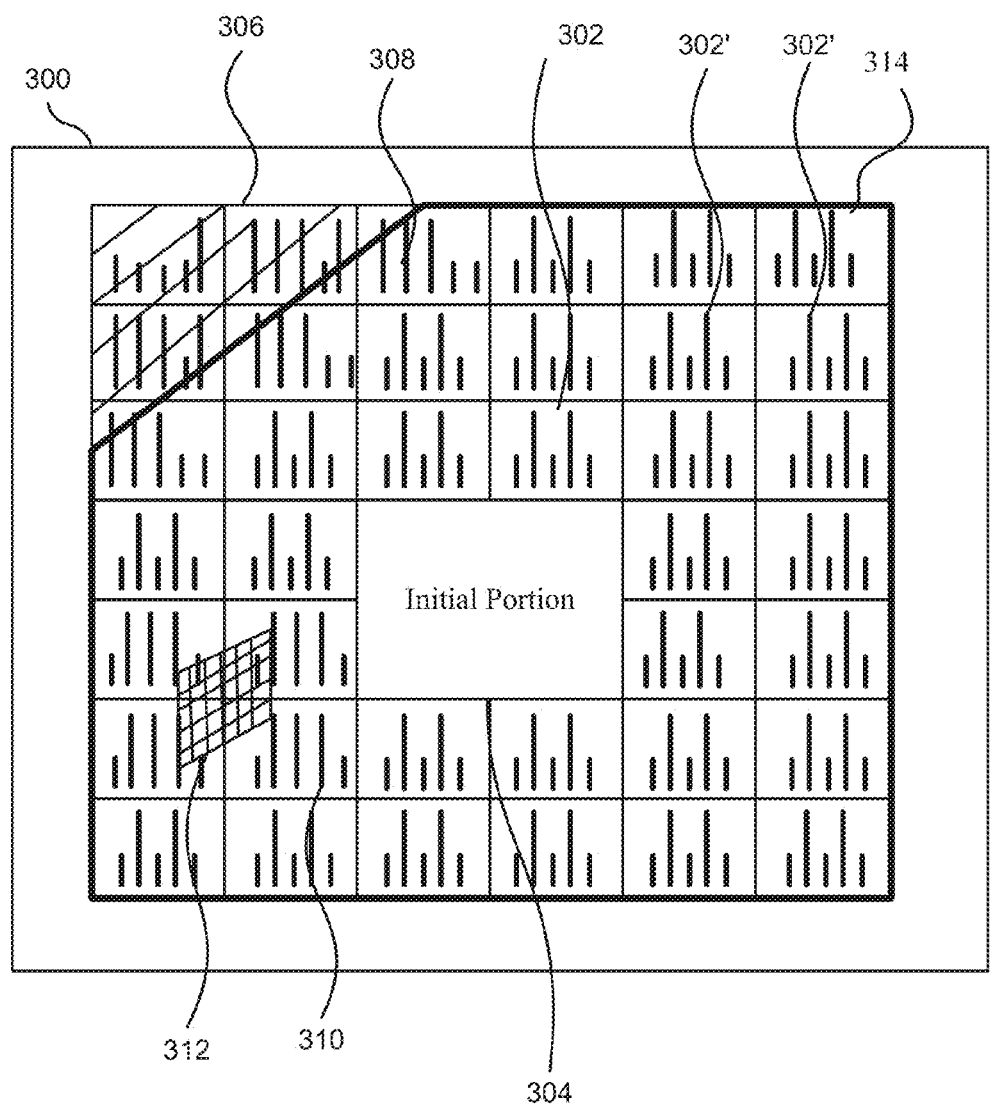
FIG. 3 illustrates an example rectified image for a physical scene that includes a physical plane, according to certain aspects of the disclosure.

FIG. 3 illustrates an example rectified image for a physical scene that includes a physical plane, according to certain aspects of the disclosure. The rectified image 300 may include a fronto-parallel view of at least part of the physical plane 314. Referring to FIG. 3, in some embodiments, image data for a scene (e.g., image 200) may be re-oriented in a bird's eye, overhead view 300. This view may be referred to herein as a canonical view or a fronto-parallel view 300. In some implementations, the rectified image may include a two-dimensional image with three-dimensional information, wherein the three-dimensional information is associated with certain features of the two-dimensional image. In other implementations, the rectified image may be a three-dimensional image.

As described above, in one implementation, a rectified image may be generated by analyzing a plurality of two-dimensional images for a physical scene. For example, multiple images of a physical scene comprising an identified object from different perspectives may be used in some instances in determining the depth of certain features of the objects and better defining the bounds of the object in a rectified image, wherein the rectified image is reoriented in a fronto-parallel view. In some embodiments, a point cloud can be created that includes multiple reference points, with each reference point having a depth value. As detailed herein, the point cloud obtained using a SLAM process may be used to create the rectified image.

In some embodiments, the fronto-parallel view 300 may be subdivided into a plurality of cells (e.g., 302, 302', 308, 310) arranged in a grid, for example, as shown in view 300. In certain embodiments, the entire or parts of the rectified image is subdivided into the plurality of cells. Each cell may be referred to herein as a grid cell. The initial portion 304 may correspond to a known target or object 204, for example the target or marker used to initially identify the plane, shown from the overhead view. However, in some implementations, the initial portion of the physical plane may be based on fitting the physical plane to a point cloud model.

In some embodiments, for each grid cell, a signature incorporating various image characteristics about the grid cell may be generated. In some embodiments, a statistical histogram of the types of colors and the number of instances (e.g. pixel by pixel) of each of the colors or three-dimensional information, such as orientation, may represent the signature of the grid cell. In other embodiments, the signature, which may be referred to herein as an image signature for clarity, may include other types of histograms, such as a gray scale histogram representing the number of shades if the image were converted to gray scale, or an orientation histogram, which may capture the set of orientations (e.g. gradients) at the points where the colors and/or intensities change. For example, the color histogram could be a histogram in UV color space e.g. split into 3×3. As another example, the orientation histogram could be e.g. eight equally spaced orientation bins. In some embodiments, a different image descriptor than a histogram may represent the image signature, such as a median color of the cell grid, some weighted average of colors of the cell grid, and so on.

Subdividing the rectified view into grid cells and analyzing the signatures of the grid cells from such a rectified view, instead of performing similar steps over a two-dimensional image, may allow to take into consideration three-dimensional aspects of the physical plane and objects that are available in the rectified image and provide a more refined digital representation of the physical plane. For example, by combining information from multiple two-dimensional images (or a depth sensor) into a rectified image reoriented in a fronto-parallel view, the bounds of the physical objects placed on the physical plane may be much more refined. For instance, in a two-dimensional image, an object place on a physical plane due to its height may occlude a large portion of the physical plane on which it shadow falls, even though it may physically sit on a small portion of the physical plane. However, in a rectified view, the actual hole created in the physical plane by the object sitting on the physical plane can be estimated with much better precision, since the rectified view is a fronto-parallel or top-down view. Therefore, a digital representation of the physical plane generated from a rectified image may provide a more accurate representation of the physical plane for augmented reality purposes.

In some embodiments, the algorithm for determining the region that represents the physical plane starts from the initial portion, which in some cases is pre-designated to reside on top of the plane. Thus, it would be safe to assume that at least a majority of the grid cells surrounding the initial portion 304, for example, grid cell 302, may be included as part of the plane. In this way, a statistical model of the planar surface is built up. To expand the plane, the statistical histogram for neighboring grid cells to those already part of the digital representation of the physical plane are tested to see if they are similar to the statistics of cells forming the digital representation of the physical plane. The comparisons in the tests may be based on comparing the image signatures between the neighboring grid cell and at least one of the cells already included as part of the digital representation of the plane. If the grid cells are sufficiently similar, based on some predetermined statistical criteria, the grid cells are added to the digital representation of the physical plane. Otherwise, the grid cells are rejected.

Still referring to FIG. 3, the lines in grid cell 302 represent an example histogram representing the image signature of grid cell 302. It can be seen that grid cells 302' appear to have a similar image signature as grid cell 302. Thus, grid cells 302' would be included as part of the plane. In contrast, grid cell 308 does not appear to have quite the similar image signature as grid cell 302. This is because the diagonally shaded region 306 represents a portion of the image 300 that is not a part of the physical plane. For example, the region 306 may be the floor, rather than the surface. Similarly, grid cell 310 also does not appear to have a similar enough image signature. This is because there is an object 312 residing on top of the surface, and the four grid cells intersecting object 312 therefore have many other colors, shades, orientation, etc., that make the grid cell have a different image signature overall.

Additional refinement techniques may be employed to refine the boundaries of digital representation of the physical plane to include portions of the grid cells that belong to the physical plane, but not included in the digital representation of the physical plane. For example, in some embodiments, a secondary set of grid cells may be generated starting from the edge grid cells, e.g. cells 308 or 310. The secondary set of grid cells may be offset some number of pixels from the original positions of grid cells 308 or 310. The entire set of secondary grid cells may contain a secondary grid cell each derived from different offsets, e.g. one secondary grid cell is offset by (0, +1) pixels, another offset by (0, +2) pixels, and others by (+1, 0), (+1, +1), (+1, +2) pixels, etc. Each of these may be tested to see if their image signatures are sufficiently similar to the image signature of known grid cells of the plane. If so, they are included. If not, they are rejected. In this way, the appropriate portions of the grid cells of image or 310 may be successfully included as part of the plane. In some instances, techniques described herein may allow for gradual change in the color of the physical plane and still allow for detection and digital representation of the physical plane. For example, the image signature for each neighboring grid cell may change gradually over multiple grid cells, such that the change between a grid cell and its neighboring grid is still within the threshold, but the change between a grid cell and a grid cell that is not a neighboring grid cell may not be within the threshold. This technique provides the flexibility for generating a digital representation of a physical plane for a surface that gradually changes color, texture or other characteristics.

Figure 4:
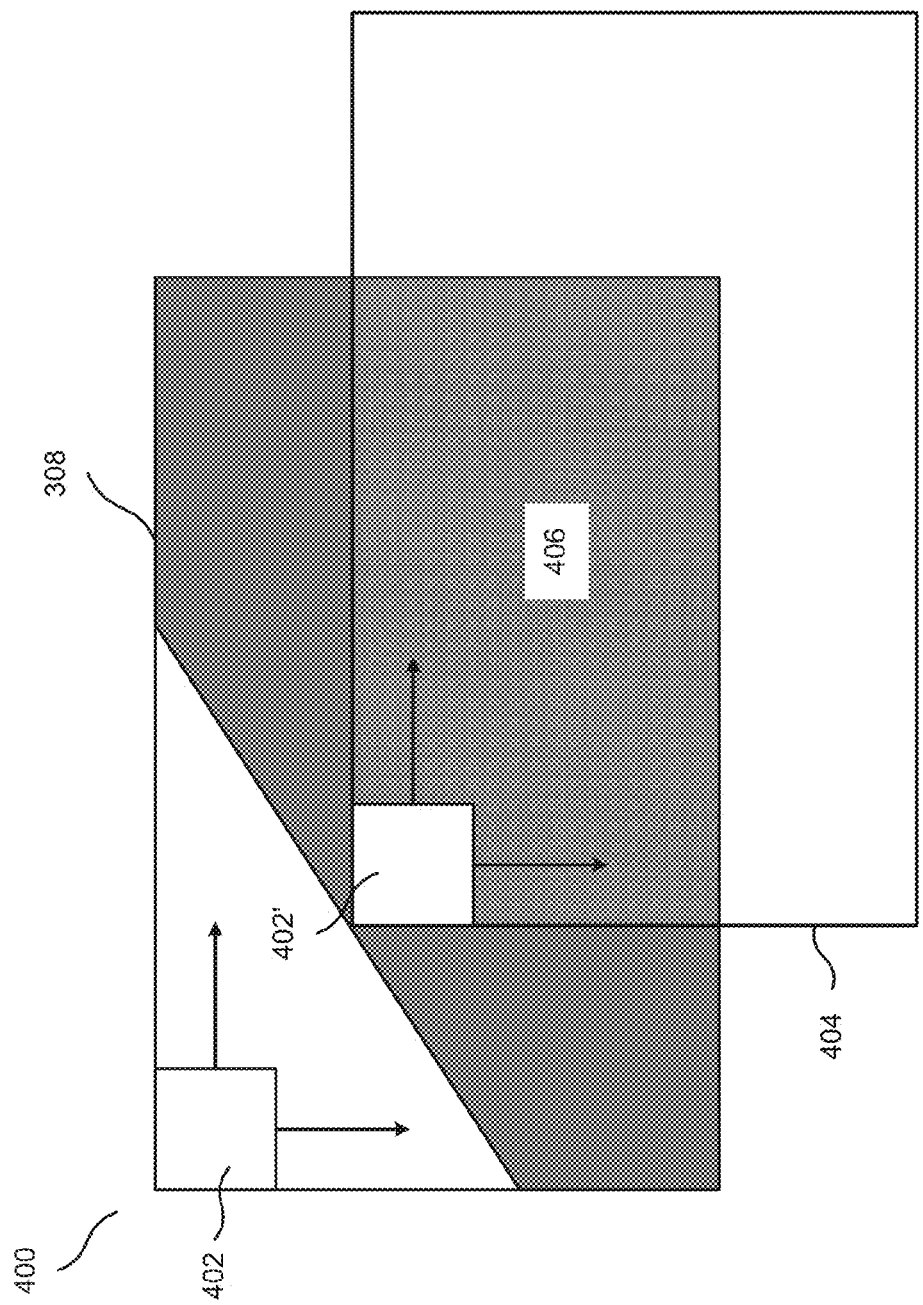
FIG. 4 illustrates an example methodology for including grid cells at the edges according to some aspects of the disclosure.

Referring to FIG. 4, illustration 400 shows a more detailed view of example offsets of the secondary grid cells for the edge grid cells of the planar surface. As mentioned above, example grid cell 308 may initially be not included as part of the plane, but some portion—just not all—should still be included as part of the plane. The secondary grid cells generated starting from grid cell 308 may be offset by some number of pixels from the initial position of grid cell 308. Pixel position 402' represents an example starting pixel position for the top left corner of the secondary grid cell. That is, pixel position 402' may represent the top-left corner of a secondary grid cell 404, where pixel position 402' can be visualized to shift one or more pixel positions to the right, and/or one or more pixel positions down from pixel 402 of grid cell 308. At each different offset of the shift of pixel position 402, a secondary grid cell can be generated with the top-left pixel being positioned at pixel position 402'.

In some embodiments, the size of the secondary grid cell is the same as the original cell, and thus as the offset pixel position 402 shifts, e.g., to the right and/or down the original grid cell 308, a portion of the secondary grid cell 404 falls outside of the bounds of the original grid cell 308. Each secondary grid cell that is offset according to the shifted pixel position 402' may be included as part of the plane if the image signature of said secondary grid cell 404 is found to be sufficiently similar to the image signatures of the one or more grid cells already included in the digital representation of the physical plane. For example, offset pixel position 402' may represent the top left corner of secondary grid cell 404. As shown, a portion of secondary grid cell 404 falls outside of grid cell 308, which also means that a portion of secondary grid cell 404 includes part of the original grid cells adjacent to grid cell 308, not shown. An image signature may be generated for secondary grid cell 404, consistent with any of the methods described herein, and said image signature may then be compared against the image signatures already included as part of the digital representation of the physical plane. If the image signature of grid cell 404 is sufficiently similar, then grid cell 404 may be included as part of the plane. Thus, region 406, the portion common between grid cell 308 and secondary grid cell 404, which was not initially included as part of the planar surface, would now be included as part of the digital representation of the planar surface.

In some embodiments, not every offset spanning the originally rejected grid cell, e.g. grid cell 308, need be examined. For example, if it is known that the physical plane extends to the right and bottom of grid cell 308, based on previous grid cell inclusions, then, starting from the top and left, once a dividing line of pixels between included pixels and excluded pixels is found, it can be assumed that the remaining secondary grid cells with offsets further to the bottom and to the right would also be included, and should therefore not be necessary to test.

In some embodiments, multiple images taken from different viewpoints can be used to add statistical information to a single rectified image comprising a fronto-parallel grid structure. Camera view tracking using e.g. SLAM or the known target can be used to warp these additional images into the fronto-parallel view. The pixels which project into the fronto-parallel grid cells are used to compute statistical histograms, similar to those described for the single image above. Separate histogram entries may be maintained for each frame, as objects that can occlude the physical plane in certain views. If a certain number of frames—or even one frame in some embodiments—show that a grid cell agrees with the statistical model representing the physical plane, the grid cell is added to the plane (if adjacent to a cell already part of the digital representation of the physical plane).

Figure 5:
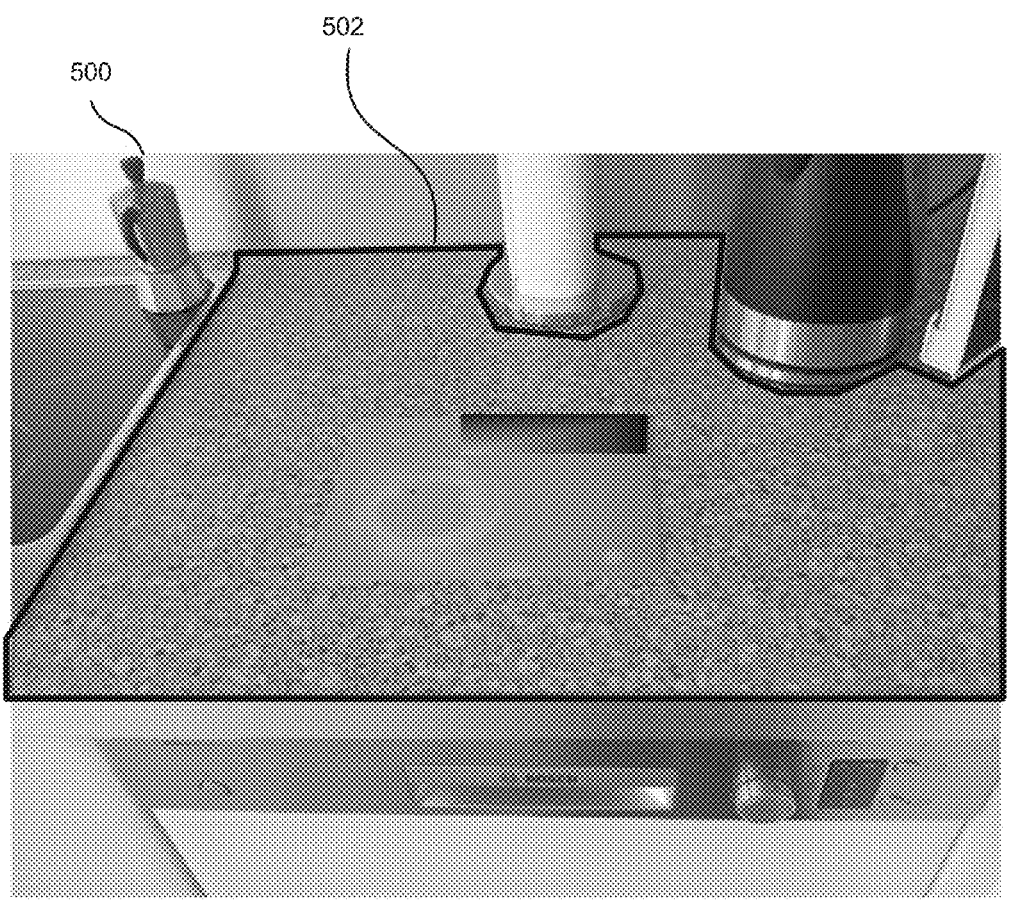
FIG. 5 illustrates an example outcome identifying the physical plane according to some embodiments.

Referring to FIG. 5, illustration 500 shows an example result of the digital representation of the physical plane determination for the physical scene 200, as shown by the bolded line 502, including the portion within line 502 as portions of the digital representation of the physical plane.

Figure 6:
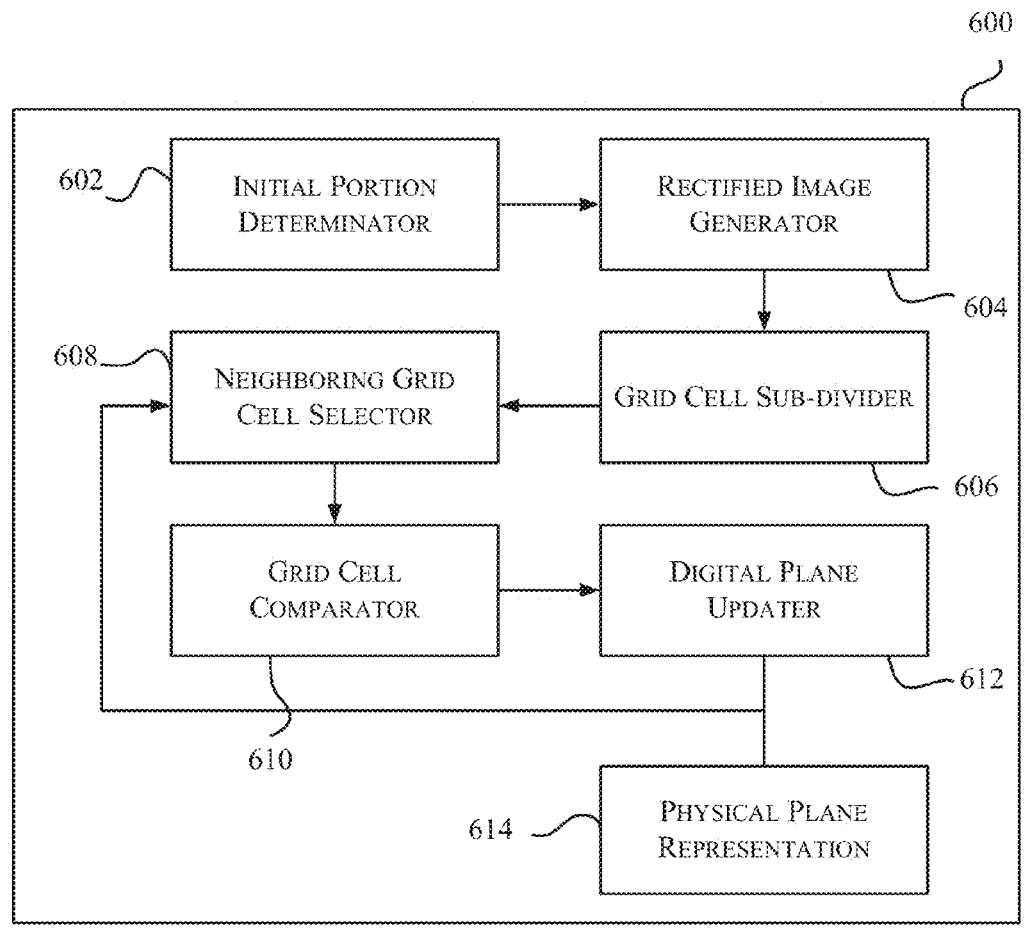
FIG. 6 is an example block diagram illustrating certain modules and components for generating a digital representation of the physical plane, according to certain aspects of the disclosure.

FIG. 6 is an example block diagram illustrating certain modules and components for generating a digital representation of the physical plane, according to certain aspects of the disclosure. Modules described in FIG. 6 may be implemented using software, firmware, hardware or any other combination thereof. In one embodiment, the modules described in FIG. 6 may be stored as software modules on a computer-readable medium 600 that may be any magnetic, electronic, optical, or other computer-readable storage medium. In one implementation, the computer-readable storage medium 600 may include an plane selection module 602, rectified image generator module 604, grid cell subdivider module 606, neighboring grid cell selector module 608, grid cell comparator module 610, digital plane updater module 612 and physical plane representation module 614.

The plane selection module 602 determines an orientation and an initial portion of a physical plane in the physical scene. A variety of techniques may be used for determining the initial portion of the plane without deviating from the scope of the invention. For example, the known target or image placed on the physical plane may be used in determining the orientation and the initial portion of the physical plane. Other techniques, such as feature and/or object detection may also be used in determining the orientation and initial portion of a physical plane.

The rectified image generator module 604 generates a rectified image that includes a fronto-parallel view of at least part of the physical plane. In one implementation, the rectified image may be generated using one or more images of the physical scene and/or pose and orientation information, as described previously. In one implementation a rectified image may be a representation of an image that includes two-dimensional and three-dimensional information.

The grid cell sub-divider module 606 may subdivide the rectified image or portions of the rectified image into a plurality of grid cells. For each of the plurality of grid cells, An image signature may be generated based on at least one image characteristic associated said grid cell. The image signature may be used in determining if the grid cell should be included as part of the digital representation of the physical plane.

The neighboring grid cell selector module 608 may select grid cells contiguous to at least part of the obtained initial portion of the physical plane or portions of the plane already included as part of the digital representation of the physical plane as potential candidates to be included as part of the digital representation of the physical plane.

The grid cell comparator module 610 compares the signatures of the neighboring grid cells with the grid cells included as part of the digital representation of the physical plane to determine if the neighboring grid cells should be included as part of the digital representation of the physical plane.

The digital plane updater module 612 updates the physical plane representation module 614 if the signature of the neighboring grid cell is similar to the signature of one or more grid cells already included in the digital representation of the physical plane. In some embodiments, the similarity is based on at least one predetermined threshold criterion.

The neighboring grid cell selector module 608 may repeat or iterate for each neighboring grid cell contiguous to a grid cell already included as part of the digital representation of the physical plane, until no more neighboring grid cells can be included as part of the digital representation of the physical plane due to the difference in the image signatures.

Figure 7:
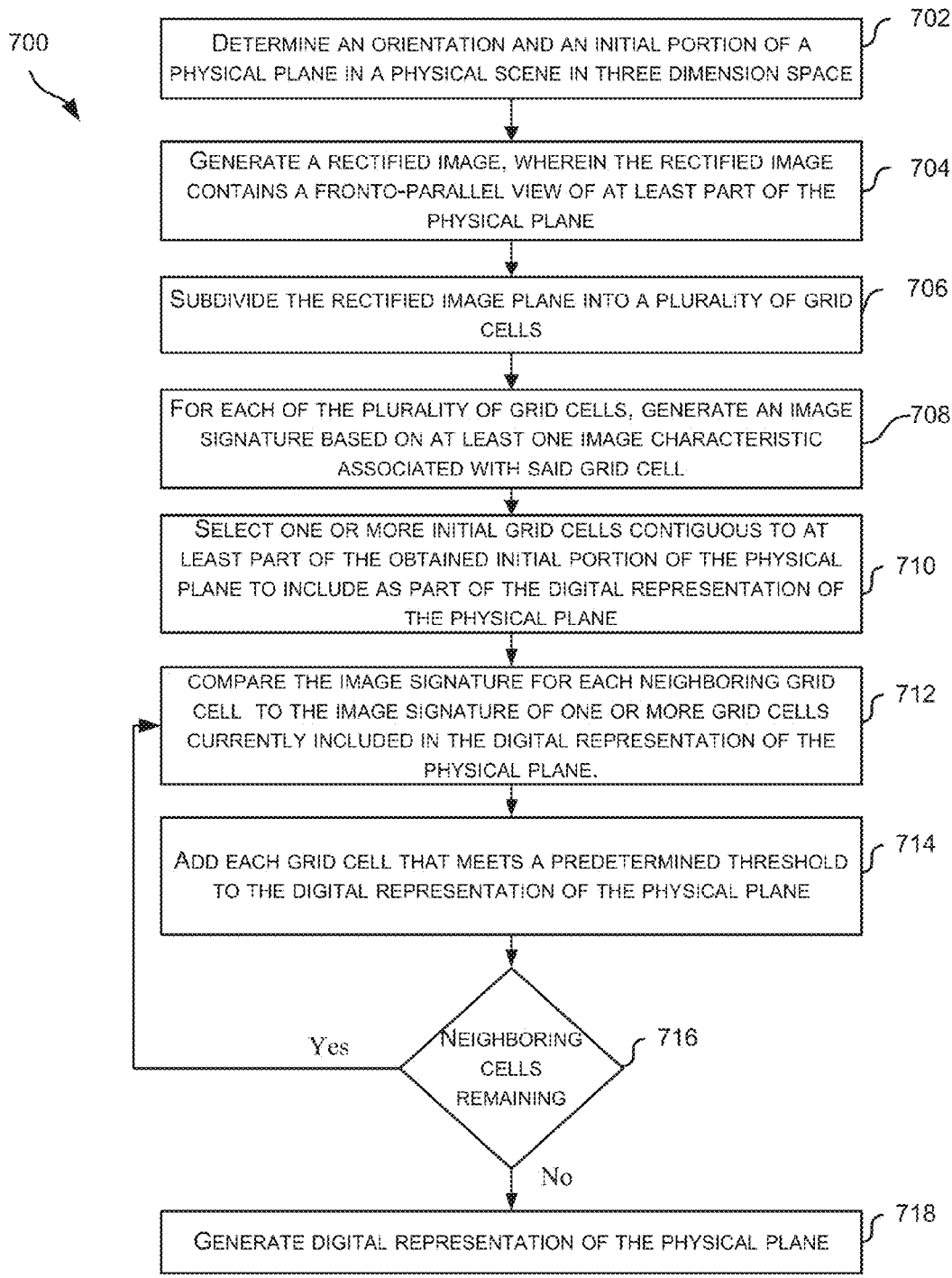
FIG. 7 is a flow diagram illustrating an example method flow for constructing a digital representation of a physical plane from a physical scene, according to some aspects of the disclosure.

FIG. 7 is a flow diagram illustrating an example method flow for constructing a digital representation of a physical plane from a physical scene, according to some embodiments. According to one or more aspects, any and/or all of the methods and/or method processes described herein may be implemented by and/or in a mobile device 102, such as the mobile device 102 and/or the device described in greater detail in FIG. 9, for instance. In one embodiment, one or more of the method processes described below with respect to FIG. 7 are implemented by a processor of the mobile device 900, such as the processor 910 or another processor. Additionally or alternatively, any and/or all of the methods and/or method steps described herein may be implemented in computer-readable instructions, such as computer-readable instructions stored on a computer-readable medium such as the memory 935, storage 925 or another computer-readable medium.

At block 702, components of the computing device may determine an initial portion of a plane in the physical scene in three-dimensional space. In one implementation, the initial portion of the physical plane may be determined based on a known object positioned on the physical plane. In another implementation, the initial portion of the physical plane is based on fitting the physical plane to a point cloud model or any other suitable technique without deviating from the scope of the invention. In some invention an initial orientation of the plane with respect to the camera taking the image may also be determined.

At block 704, components of the computing device may generate a rectified image, where the rectified image contains a fronto-parallel view of at least part of the physical plane. In one implementation, the rectified image may be generated using one or more images of the physical scene and/or pose and orientation information, as described previously. In one implementation, a rectified image may be a representation of an image that includes two-dimensional and three-dimensional information.

At block 706, components of the computing device may subdivide the rectified image comprising the fronto-parallel view of the physical plane into a plurality of grid cells. Each grid cell may include a plurality of two dimensional and/or three dimensional information.

At block 708, components of the computing device may generate an image signature for each of the plurality of grid cells, based on at least one image characteristic about said grid cell. In one implementation, the image signature may include at least one histogram indicative of image information about the grid cell, such as statistical representation of an amount and type of colors present in the grid cell, gradient orientation of the grid cell, or amount and type of gray scale shades representative of colors present in the grid cell.

At block 710, components of the computing device may select one or more initial grid cells contiguous to at least part of the obtained initial portion of the physical plane to include as part of the digital representation of the physical plane. In certain implementations, it may be assumed that the grid cells contiguous to at least part of the obtained initial portion from the rectified image belong to the physical plane.

At block 712, components of the computing device may compare the image signature for each neighboring grid cell to the image signature of one or more grid cells currently included in the digital representation of the plane.

At block 714, components of the computing device may add each grid cell that meets a predetermined threshold to the digital representation of the plane. In one implementation, the at least one image characteristic associated with the said grid cell comprises three-dimensional information. In some implementations, the threshold value may be configured by the AR system, the application or the user. In other implementations, components of the computing device may determine a threshold based on image characteristics, such as resolution of the image, distortion in the image, etc.

At block 716, components of the computing device determine if additional neighboring cells are still available for potentially adding to the digital representation of the physical plane. For example, additional cells may not be available if a boundary has been reached. In certain embodiments, for each remaining neighboring grid cell, components of the computing device repeat blocks 712, by comparing the image signature to the one or more grid cells currently included in the digital representation of the plane, and repeat block 714 by adding each grid cell that meets the predetermined threshold to the digital representation of the plane. If no additional grid cells remain for further evaluation, at block 718, components of the computing device generate the digital representation of the physical plane.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Figure 8:
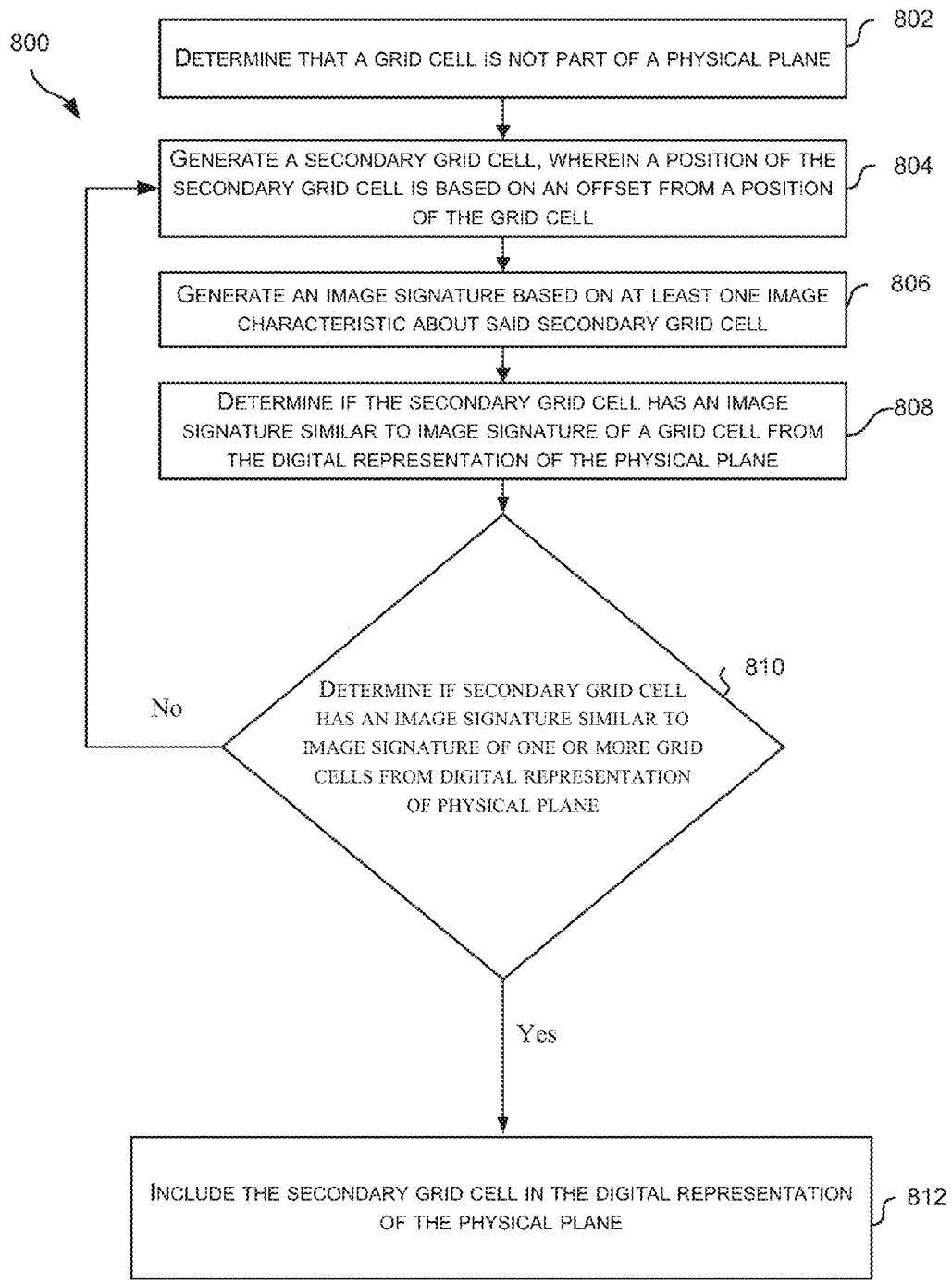
FIG. 8 is a flow diagram illustrating an example method flow for including portions of a grid cell as part of the digital representation of a physical plane from a physical scene, according to some aspects of the disclosure.

FIG. 8 is a flow diagram illustrating an example method flow for including portions of a grid cell as part of the digital representation of a physical plane from a physical scene, according to some aspects of the disclosure. According to one or more aspects, any and/or all of the methods and/or method processes described herein may be implemented by and/or in a mobile device 102, such as the mobile device 102 and/or the device described in greater detail in FIG. 9, for instance. In one embodiment, one or more of the method processes described below with respect to FIG. 8 are implemented by a processor of the mobile device 900, such as the processor 910 or another processor. Additionally or alternatively, any and/or all of the methods and/or method steps described herein may be implemented in computer-readable instructions, such as computer-readable instructions stored on a computer-readable medium such as the memory 35, storage 925 or another computer-readable medium.

At block 712-716 of FIG. 7, components of the computing device may determine that a grid cell is not part of a physical plane and stop iterating through additional neighboring grid cells. However, at that point, in some implementations a refinement process for the boundary may initiate as described in FIG. 7 below. The process is described for a single grid cell, however may apply to all or most of the grid cells on the boundary that are determined to not be similar to their neighboring grid cells.

At block 802, components of the computing device may determine that a grid cell is not part of a physical plane. In some aspects, the processor may compare the signature of the grid cell to the signature of one or more grid cells included as part of the digital representation of the physical plane in determining that the grid cell is not part of the physical plane.

At block 804, components of the computing device may generate a secondary grid cell, wherein a position of the secondary cell is based on an offset from a position of the grid cell. The secondary grid cell may be generated such that a larger portion of the physical plane is included in the secondary grid cell than in the grid cell.

At block 806, components of the computing device may generate an image signature based on at least one image characteristic associated with the secondary grid cell. In one implementation, the image signature may include at least one histogram indicative of image information about the grid cell, such as statistical representation of an amount and type of colors present in the grid cell, gradient orientation of the grid cell, or amount and type of gray scale shades representative of colors present in the grid cell. In one aspect, the at least one predetermined threshold criterion is based on comparing the at least one histogram of the grid cell already included as part of the plane to the histogram of neighboring grid cell. In one implementation, the at least one image characteristic associated with the said grid cell comprises three-dimensional information.

At block 808, components of the computing device may determine if the secondary grid cell has an image signature similar to image signature of a grid cell from the digital representation of the physical plane.

At block 810, components of the computing device may determine if the secondary grid cell has an image signature similar to image signature of one or more grid cells from the digital representation of the physical plane.

If the secondary grid cell does have an image signature similar to image signature of one or more grid cells from the digital representation of the physical plane, then, at block 812, components of the computing device may include the secondary grid cells in the digital representation of the physical plane.

If the secondary grid cell does not have an image signature similar to image signature of one or more grid cells from the digital representation of the physical plane, then components of the computing device may re-iterate by generating another secondary cell with a new offset at block 804.

In some embodiments, the size of the secondary grid cell is the same as the original cell, and thus as the offset pixel position 402 shifts, e.g., to the right and/or down the original grid cell 308, a portion of the secondary grid cell falls outside of the bounds of the original grid cell 308. Each secondary grid cell that is offset according to the shifted pixel position 402' may be included as part of the plane if the image signature of said secondary grid cell is found to be sufficiently similar to the image signatures of the grid cells included in the digital representation of the physical plane. For example, offset pixel position 402' may represent the top left corner of secondary grid cell 404. As shown, a portion of secondary grid cell 404 falls outside of grid cell 308, which also means that a portion of secondary grid cell 404 includes part of the original grid cells adjacent to grid cell 308, not shown. An image signature may be generated for secondary grid cell 404, consistent with any of the methods described herein, and said image signature may then be compared against the image signatures already included as part of the digital representation of the physical plane. If the image signature of grid cell 404 is sufficiently similar, then grid cell may be included as part of the plane. Thus, region 406, the portion common between grid cell 308 and secondary grid cell 404, which was not initially included as part of the planar surface, would now be included as part of the planar surface.

In some implementations, not every offset spanning the originally rejected grid cell may be examined. For example, with enough sparsely included corner pixels for a boundary it can be assumed that the remaining secondary grid cells with offsets in between would also be included, and should therefore not be necessary to test.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Many embodiments may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 9:
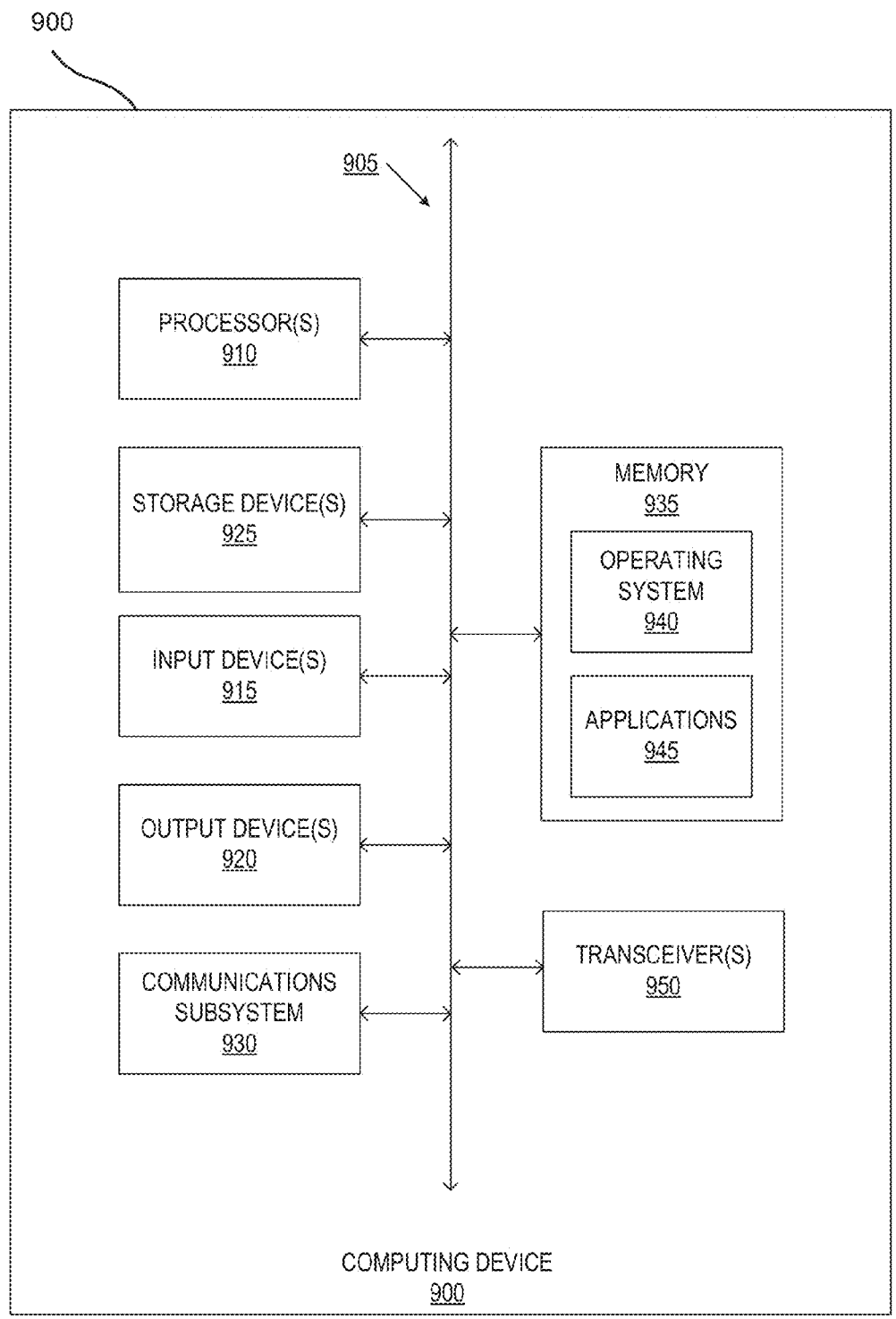
FIG. 9 is a block diagram of a computing device according to some embodiments.

Having described multiple aspects of defining a dense representation of a planar surface in AR environments, an example of a computing system in which various aspects of the disclosure may be implemented will now be described with respect to FIG. 9. According to one or more aspects, a computer system as illustrated in FIG. 9 may be incorporated as part of a computing device, which may implement, perform, and/or execute any and/or all of the features, methods, and/or method steps described herein. For example, computer system 900 may represent some of the components of a hand-held device. A hand-held device may be any computing device with an input sensory unit, such as a wireless receiver or modem. Examples of a hand-held device include but are not limited to video game consoles, tablets, smart phones, televisions, AR goggles, and mobile devices or mobile stations. In some embodiments, the system 900 is configured to implement any of the methods described above. FIG. 9 provides a schematic illustration of one embodiment of a computer system 900 that can perform the methods provided by various other embodiments, as described herein, and/or can function as the host computer system, a remote kiosk/terminal, a point-of-sale device, a mobile device, a set-top box, and/or a computer system. FIG. 9 is meant only to provide a generalized illustration of various components, any and/or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a camera, wireless receivers, wireless sensors, a mouse, a keyboard and/or the like; and one or more output devices 920, which can include without limitation a display unit, a printer and/or the like. In some embodiments, the one or more processor 910 may be configured to perform a subset or all of the functions described above with respect to FIGS. 1-8. The processor 910 may comprise a general processor and/or and application processor, for example. In some embodiments, the processor is integrated into an element that processes visual tracking device inputs and wireless sensor inputs.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth® device, an 902.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a non-transitory working memory 935, which can include a RAM or ROM device, as described above. In some embodiments communications subsystem 930 may interface with transceiver(s) 950 configured to transmit and receive signals from access points or mobile devices. Some embodiments may include a separate receiver or receivers, and a separate transmitter or transmitters.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 9, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 900) to perform methods in accordance with the disclosure. For example, some or all of the procedures of the described methods may be performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein, for example methods described with respect to FIG. 9.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communications subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910. Memory 935 may contain at least one database according to any of the databases and methods described herein. Memory 635 may thus store any of the values discussed in any of the present disclosures, including FIGS. 1-8, and related descriptions.

The methods described in FIG. 7 and FIG. 8 may be implemented by various blocks in FIG. 9. For example, processor 910 may be configured to perform any of the functions of blocks in flowchart 700 and flowchart 800. Storage device 925 may be configured to store an intermediate result, such as a globally unique attribute or locally unique attribute discussed within any of blocks mentioned herein. Storage device 925 may also contain a database consistent with any of the present disclosures. The memory 935 may similarly be configured to record signals, representation of signals, or database values necessary to perform any of the functions described in any of the blocks mentioned herein. Results that may need to be stored in a temporary or volatile memory, such as RAM, may also be included in memory 935, and may include any intermediate result similar to what may be stored in storage device 925. Input device 915 may be configured to receive wireless signals from satellites and/or base stations according to the present disclosures described herein. Output device 920 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for constructing a digital representation of a physical plane from a physical scene, the method comprising:

determining an orientation and an initial portion of a physical plane in the physical scene in three dimensional space;

generating a three dimensional rectified image, wherein the rectified image contains a fronto-parallel view of at least part of the physical plane and wherein the rectified image is generated by matching reference points in a plurality of two dimensional images of the physical plane captured from different locations with different distances to the reference points in the physical scene;

subdividing the rectified image into a plurality of grid cells;

for each of the plurality of grid cells, generating an image signature based on at least one image characteristic associated with said grid cell, wherein the at least one image characteristic comprises three dimensional information derived from the reference points;

selecting one or more initial grid cells contiguous to at least part of the initial portion of the physical plane to include as part of the digital representation of the physical plane;

comparing, as a first comparison, the image signature for each neighboring grid cell contiguous to the one or more initial grid cells to the image signature for one or more grid cells currently included in the digital representation of the physical plane; and adding each grid cell that meets a predetermined threshold for the first comparison to the digital representation of the physical plane.

2. The method of claim 1, further comprising:

comparing, as a second comparison, the image signature for each neighboring grid cell contiguous to a grid cell already included as part of the digital representation of the physical plane to the image signature for the contiguous grid cell; and adding each grid cell that meets the predetermined threshold for the second comparison to the digital representation of the physical plane.

3. The method of claim 1, wherein the initial portion of the physical plane is based on a known object positioned on the physical plane.

4. The method of claim 1, wherein the initial portion of the physical plane is based on fitting the physical plane to a point cloud model.

5. The method of claim 1, wherein the image signature comprises at least one histogram indicative of image information associated with the grid cell.

6. The method of claim 5, wherein the at least one histogram comprises a statistical representation of an amount and type of colors present in the grid cell.

7. The method of claim 5, wherein the at least one histogram comprises a statistical representation of a gradient orientation of the grid cell.

8. The method of claim 5, wherein the at least one histogram comprises a statistical representation of an amount and type of gray scale shades representative of colors present in the grid cell.

9. The method of claim 1, further comprising, for each neighboring grid cell determined to not be included as part of the digital representation of the physical plane:

generating a plurality of secondary grid cells, wherein a position of each of the plurality of secondary grid cells is based on an offset from a position of said neighboring grid cell, wherein the offset is within a width and a length of said neighboring grid cell; and for each of the plurality of secondary grid cells:

generating an image signature based on at least one image characteristic associated with the secondary grid cell; and determining whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

10. An apparatus for constructing a digital representation of a physical plane from a physical scene, comprising:

memory;

one or more processors configured to:

determine an orientation and an initial portion of a physical plane in the physical scene in three dimensional space;

receive a plurality of two dimensional images of the physical plane;

generate a three dimensional rectified image, wherein the rectified image contains a fronto-parallel view of at least part of the physical plane and wherein the rectified image is generated by matching reference points in the plurality of two dimensional images of the physical plane captured from different locations with different distances to the reference points in the physical scene;

subdivide the rectified image into a plurality of grid cells;

for each of the plurality of grid cells, generate an image signature based on at least one image characteristic associated with said grid cell, wherein the at least one image characteristic comprises three dimensional information derived from the reference points;

select one or more initial grid cells contiguous to at least part of the initial portion of the physical plane to include as part of the digital representation of the physical plane;

compare, as a first comparison, the image signature for each neighboring grid cell contiguous to the one or more initial grid cells to the image signature for one or more grid cells currently included in the digital representation of the physical plane; and add each grid cell that meets a predetermined threshold for the first comparison to the digital representation of the physical plane.

11. The apparatus of claim 10, further comprising:

comparing, as a second comparison, the image signature for each neighboring grid cell contiguous to a grid cell already included as part of the digital representation of the physical plane to the image signature for the contiguous grid cell; and adding each grid cell that meets the predetermined threshold for the second comparison to the digital representation of the physical plane.

12. The apparatus of claim 10, wherein the initial portion of the physical plane is based on a known object positioned on the physical plane.

13. The apparatus of claim 10, wherein the initial portion of the physical plane is based on fitting the physical plane to a point cloud model.

14. The apparatus of claim 10, wherein the image signature comprises at least one histogram indicative of image information associated with the grid cell.

15. The apparatus of claim 14, wherein the at least one histogram comprises a statistical representation of an amount and type of colors present in the grid cell.

16. The apparatus of claim 14, wherein the at least one histogram comprises a statistical representation of a gradient orientation of the grid cell.

17. The apparatus of claim 14, wherein the at least one histogram comprises a statistical representation of an amount and type of gray scale shades representative of colors present in the grid cell.

18. The apparatus of claim 10, for each neighboring grid cell determined to not be included as part of the digital representation of the physical plane, the one or more processors further configured to:
 generate a plurality of secondary grid cells, wherein a position of each of the plurality of secondary grid cells is based on an offset from a position of said neighboring grid cell, wherein the offset is within a width and a length of said neighboring grid cell; and
 for each of the plurality of secondary grid cells:
 generate an image signature based on at least one image characteristic associated with the secondary grid cell; and
 determine whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

19. A non-transitory computer-readable storage medium, wherein the non-transitory computer-readable storage medium comprises instructions executable by a processor, the instructions comprising instructions to:
 determine an orientation and an initial portion of a physical plane in the physical scene in three dimensional space;
 receive a plurality of two dimensional images of the physical plane;
 generate a three dimensional rectified image, wherein the rectified image contains a fronto-parallel view of at least part of the physical plane and wherein the rectified image is generated by matching reference points in the plurality of two dimensional images of the physical plane captured from different locations with different distances to the reference points in the physical scene;
 subdivide the rectified image into a plurality of grid cells;
 for each of the plurality of grid cells, generate an image signature based on at least one image characteristic associated with said grid cell, wherein the at least one image characteristic comprises three dimensional information derived from the reference points;
 select one or more initial grid cells contiguous to at least part of the initial portion of the physical plane to include as part of the digital representation of the physical plane;
 compare, as a first comparison, the image signature for each neighboring grid cell contiguous to the one or more initial grid cells to the image signature for one or more grid cells currently included in the digital representation of the physical plane; and
 add each grid cell that meets a predetermined threshold for the first comparison to the digital representation of the physical plane.

20. The non-transitory computer-readable storage medium of claim 19, further comprising:
 comparing, as a second comparison, the image signature for each neighboring grid cell contiguous to a grid cell already included as part of the digital representation of the physical plane to the image signature for the contiguous grid cell; and
 adding each grid cell that meets the predetermined threshold for the second comparison to the digital representation of the physical plane.

21. The non-transitory computer-readable storage medium of claim 19, wherein the image signature comprises at least one histogram indicative of image information associated with the grid cell.

22. The non-transitory computer-readable storage medium of claim of claim 19, wherein for each neighboring grid cell determined to not be included as part of the digital representation of the physical plane, the one or more processors further configured to:
 generate a plurality of secondary grid cells, wherein a position of each of the plurality of secondary grid cells is based on an offset from a position of said neighboring grid cell, wherein the offset is within a width and a length of said neighboring grid cell; and
 for each of the plurality of secondary grid cells:
 generate an image signature based on at least one image characteristic associated with the secondary grid cell; and
 determine whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

23. The apparatus for constructing a digital representation of a physical plane from a physical scene, the apparatus comprising:
 means for determining an orientation and an initial portion of a physical plane of the physical scene in three dimensional space;
 means for generating a three dimensional rectified image, wherein the rectified image contains a fronto-parallel view of at least part of the physical plane and wherein the rectified image is generated by matching reference points in a plurality of two dimensional images of the physical plane captured from different locations with different distances to the reference points in the physical scene;
 means for subdividing the rectified image into a plurality of grid cells;
 for each of the plurality of grid cells, means for generating an image signature based on at least one image characteristic associated with said grid cell, wherein the at least one image characteristic comprises three dimensional information derived from the reference points;
 means for selecting one or more initial grid cells contiguous to at least part of the initial portion of the physical plane to include as part of the digital representation of the physical plane;
 means for comparing, as a first comparison, the image signature for each neighboring grid cell contiguous to the one or more initial grid cells to the image signature for one or more grid cells currently included in the digital representation of the physical plane; and
 means for adding each grid cell that meets a predetermined threshold for the first comparison to the digital representation of the physical plane.

24. The apparatus of claim 23, further comprising:
- means for comparing, as a second comparison, the image signature for each neighboring grid cell contiguous to a grid cell already included as part of the digital representation of the physical plane to the image signature for the contiguous grid cell; and
- means for adding each grid cell that meets the predetermined threshold for the second comparison to the digital representation of the physical plane.

25. The apparatus of claim 23, wherein the image signature comprises at least one histogram indicative of image information associated with the grid cell.

26. The apparatus of claim 23, further comprising, for each neighboring grid cell determined to not be included as part of the digital representation of the physical plane:
- means for generating a plurality of secondary grid cells, wherein a position of each of the plurality of secondary grid cells is based on an offset from a position of said neighboring grid cell, wherein the offset is within a width and a length of said neighboring grid cell; and for each of the plurality of secondary grid cells:
- means for generating an image signature based on at least one image characteristic associated with the said secondary grid cell; and
- means for determining whether said secondary grid cell is to be additionally included as part of the digital representation of the physical plane if the image signature of said secondary grid cell is similar to the image signature of a grid cell already determined to be included as part of the digital representation of the physical plane, wherein the similarity is based on at least one predetermined threshold criterion.

\* \* \* \* \*